US008667573B2

(12) United States Patent
Lawrence et al.

(10) Patent No.: US 8,667,573 B2
(45) Date of Patent: Mar. 4, 2014

(54) VALIDATING THE ORIGIN OF WEB CONTENT

(75) Inventors: Eric M. Lawrence, Redmond, WA (US); Roberto A. Franco, Seattle, WA (US); Venkatraman V. Kudallur, Redmond, WA (US); Marc A. Silbey, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/465,426

(22) Filed: May 7, 2012

(65) Prior Publication Data

US 2012/0222137 A1 Aug. 30, 2012

Related U.S. Application Data

(63) Continuation of application No. 12/772,616, filed on May 3, 2010, now Pat. No. 8,176,542, which is a continuation of application No. 11/093,527, filed on Mar. 30, 2005, now Pat. No. 7,725,930.

(51) Int. Cl.
*H04L 9/32* (2006.01)

(52) U.S. Cl.
USPC ........... 726/10; 726/2; 726/3; 726/4; 726/22; 726/23; 726/24; 713/155; 713/156; 713/171; 713/175; 713/176; 380/279

(58) Field of Classification Search
USPC .......... 380/279; 713/155, 156, 168, 171, 175, 713/176; 726/2–4, 22–24
See application file for complete search history.

(56) References Cited

U.S. PATENT DOCUMENTS

| | | | |
|---|---|---|---|
| 5,949,413 A | 9/1999 | Lerissa et al. | |
| 6,018,724 A | 1/2000 | Arent | |
| 6,247,020 B1 | 6/2001 | Minard | |
| 6,324,628 B1 | 11/2001 | Chan | |
| 6,359,634 B1 | 3/2002 | Cragun et al. | |
| 6,433,801 B1 | 8/2002 | Moon et al. | |
| 6,456,303 B1 | 9/2002 | Walden et al. | |
| 6,489,975 B1 | 12/2002 | Patil et al. | |
| 6,801,227 B2 | 10/2004 | Bocionek et al. | |
| 6,850,913 B2 | 2/2005 | Feik | |
| 6,874,084 B1 | 3/2005 | Dobner et al. | |
| 7,024,691 B1 | 4/2006 | Herzberg et al. | |

(Continued)

FOREIGN PATENT DOCUMENTS

| | | |
|---|---|---|
| EP | 1265182 | 12/2002 |
| GB | 2360921 | 10/2001 |
| WO | WO-02099689 | 12/2002 |

OTHER PUBLICATIONS

VeriSign, Inc., "Licensing VeriSign Certificates: Securing multiple Web Server and Domain Configurations," White Paper, 2002, http://www.verisign.com/static/001496.pdf.*

(Continued)

*Primary Examiner* — Jeffrey Pwu
*Assistant Examiner* — Hee Song
(74) *Attorney, Agent, or Firm* — Andrew Sanders; Micky Minhas; Wolfe-SBMC

(57) ABSTRACT

Described herein is a technique of protecting users against certain types of Internet attacks. The technique involves obtaining certificates from visited web sites and qualifying communications with those web sites based on the content of the certificates.

20 Claims, 4 Drawing Sheets

(56) References Cited

U.S. PATENT DOCUMENTS

| | | | |
|---|---|---|---|
| 7,114,177 | B2 | 9/2006 | Rosenberg et al. |
| 7,167,985 | B2 | 1/2007 | Ahmed |
| 7,320,143 | B2* | 1/2008 | Le Pennec et al. ............. 726/30 |
| 7,725,930 | B2 | 5/2010 | Lawrence |
| 7,743,254 | B2 | 6/2010 | Sauve et al. |
| 7,757,088 | B2 | 7/2010 | Abdulhayoglu |
| 8,176,542 | B2 | 5/2012 | Lawrence |
| 2002/0053023 | A1 | 5/2002 | Patterson et al. |
| 2002/0124172 | A1* | 9/2002 | Manahan ..................... 713/176 |
| 2002/0166049 | A1 | 11/2002 | Sinn |
| 2002/0184491 | A1 | 12/2002 | Morgan et al. |
| 2003/0007646 | A1 | 1/2003 | Hurst et al. |
| 2003/0023878 | A1 | 1/2003 | Rosenberg et al. |
| 2003/0028762 | A1 | 2/2003 | Trilli et al. |
| 2003/0071849 | A1 | 4/2003 | Ferri |
| 2004/0030887 | A1* | 2/2004 | Harrisville-Wolff et al. . 713/155 |
| 2004/0030888 | A1* | 2/2004 | Roh et al. ..................... 713/156 |
| 2004/0215649 | A1 | 10/2004 | Whalen et al. |
| 2004/0250075 | A1* | 12/2004 | Anthe et al. .................. 713/175 |
| 2005/0015726 | A1 | 1/2005 | Tuominen |
| 2005/0149486 | A1 | 7/2005 | Nason et al. |
| 2005/0154889 | A1* | 7/2005 | Ashley et al. ................ 713/171 |
| 2005/0256960 | A1 | 11/2005 | Ganesh et al. |
| 2005/0268100 | A1 | 12/2005 | Gasparini et al. |
| 2006/0041936 | A1 | 2/2006 | Anderson et al. |
| 2006/0053293 | A1 | 3/2006 | Zager et al. |
| 2006/0200866 | A1 | 9/2006 | Cameron et al. |
| 2006/0218403 | A1 | 9/2006 | Sauve et al. |
| 2006/0230272 | A1 | 10/2006 | Lawrence et al. |
| 2010/0211773 | A1 | 8/2010 | Lawrence et al. |
| 2010/0217989 | A1 | 8/2010 | Sauve et al. |
| 2013/0332740 | A1 | 12/2013 | Sauve |

OTHER PUBLICATIONS

Amir Herzberg and Ahamad Gbara, "Protecting Naive Web Users, or Preventing Spoofing and Establising Credentials of Web Sites, "Bar Ilan University, Jul. 2004, http://www.cs.bu.ac.il/~herzea/Papers/ecommerce/trusted credentiials area.pdf.*

"Final Offce Action", U.S. Appl. No. 11/093,527, (Mar. 4, 2009),27 pages.

"Final Office Action", U.S. Appl. No. 12/772,616, (Nov. 25, 2011),10 pages.

"Maxthon Tabbed Browser", Retrieved from: <http://maxthon.com/> on Jan. 25, 2006,3 pages.

"Netscape 7.1 Highlights", Retrieved from: <http://channels.netscape.com/browsers/7/learnmore/NS71_reviewersguide.pdf>, (2003),46 pages.

"Non-Final Office Action", U.S. Appl. No. 12/772,616, (Jul. 13, 2011),27 pages.

"Non-Final Office Action", U.S. Appl. No. 11/093,527, (Aug. 6, 2009),30 pages.

"Non-Final Office Action", U.S. Appl. No. 11/093,527, (Aug. 20, 2008),25 pages.

"Notice of Allowance", U.S. Appl. No. 11/093,527, (Jan. 12, 2010),13 pages.

"Notice of Allowance", U.S. Appl. No. 12/772,616, (Jan. 9, 2012),7 pages.

"Opera for Windows", Retrieved from http://www.opera.com/products/desktop/ on Jan. 25, 2006,4 pages.

"Protecting Commercial Secure Web Servers from Key-Finding Threats", *nCipher, Inc.*, Available at <www.ncipher.com/uploads/resources/pcws.pdf>,(1999),12 pages.

"Tabbrowser Preferences—Firefox Extension", Retrieved from: <https://addons.mozilla.org/moreinfo.php?id=158&application=firefox> on Jan. 25, 2006,8 pages.

Herzberg, Amir et al., "Protecting (even) Naive Web Users, or: Preventing Spoofing and Establishing Credentials of Web Sites", *Bar Ilan University*, Available at <www.cs.bu.ac.il/~herzea/papers/ecommerce/trusted credentialsarea.pdf>,(Jul. 18, 2004),26 pages.

Verisign Inc., "Licensing VeriSign Certificates: Securing Multiple Web Server and Domain Configurations", *White Paper*, Available at <www.msctrustgate.com/pdf/licensing.pdf>,(Nov. 2, 2001),15 pages.

"Changelog for Opera 8.0 for Windows", Retrieved from: <http://www.opera.com/docs/changelogs/windows/800/sincebeta.dml> on Jan. 2, 2012,2 pages.

"Changelog for Opera Beta 2 for Windows", Retrieved from: <http://www.opera.com/docs/changelogs/windows/800b2/> on Jan. 2, 2012,(Feb. 2005), 3 pages.

"Changelog for Opera Beta 3 for Windows", Retrieved from: <http://www.opera.com/docs/changelogs/windows/800b3/> on Jan. 2, 2012,(Mar. 16, 2005), 2 pages.

"Changelog for Opera Beta for Windows", Retrieved from: <http://www.opera.com/docs/changelogs/windows/operabeta/> on Jan. 2, 2012,(Dec. 2004), 3 pages.

"Final Office Action", U.S. Appl. No. 11/089,544, (Mar. 17, 2009), 9 pages.

"Final Office Action", U.S. Appl. No. 12/776,260, (Oct. 16, 2012), 6 pages.

"First Opera 8 Upgrade Released Today", Retrieved from: <http://www.opera.com/press/release/2005/06/16> on Jun. 13, 2011,(Jun. 16, 2005), 1 page.

"Non-Final Office Action", U.S. Appl. No. 11/089,544, (Sep. 18, 2009), 12 pages.

"Non-Final Office Action", U.S. Appl. No. 11/089,544, (Sep. 8, 2008), 10 pages.

"Non-Final Office Action", U.S. Appl. No. 12/776,260, (Jan. 5, 2012), 15 pages.

"Non-Final Office Action", U.S. Appl. No. 12/776,260, (Jun. 21, 2011), 15 pages.

"Notice of Allowance", U.S. Appl. No. 11/089,544, (Feb. 17, 2010), 4 pages.

"Opera for Windows", Retrieved from: <http://www.opera.com/products/desktop/> on Jan. 25, 2006), 4 pages.

"Opera Version History", Retrieved from: <www.opera.com/docs/history/> on Dec. 2, 2012,(Dec. 6, 2011), 37 pages.

Gregory, Andrew "New Security Features in Opera 8", Retrieved from: <http://operawiki.info/SecurityFeatures> on Jun. 13, 2011,(Apr. 19, 2005), 3 pages.

Herzberg, Amir et al., "Trustbar: Protecting (even Naive) Web Users from Spoofing and Phishing attacks", ACM Transactions on Internet Technology (TOIT) vol. 8, Issue 4, Available at <http://u.cs.biu.ac.il/~herzbea/Papers/ecommerce/spoofing.htm>,(Sep. 2004), 23 pages.

"Notice of Allowance", U.S. Appl. No. 12/776,260, (Jan. 4, 2013), 4 pages.

"Notice of Allowance", U.S. Appl. No. 12/776,260, (Apr. 24, 2013), 9 pages.

"Notice of Allowance", U.S. Appl. No. 12/776,260, (Aug. 29, 2013), 7 pages.

"Why Strong Validation Processes for SSL are Essential for the Preservation of Trust in the Internet Economy", retrieved from http://ssl-ua.com/comodo_faq-russian.html on Apr. 15, 2003 (2002),13 pages.

Honjo, Shinsuke et al., "Internet-Marks: The Secure Seal for WWW Site Authentication"Proceedings: In Parallel and Distributed Systems: Workshops, Seventh International Conference, (Oct. 7, 2000), 6 pages.

"Non-Final Office Action", U.S. Appl. No. 12/776,260, (Sep. 26, 2013), 10 pages.

* cited by examiner

VALIDATING THE ORIGIN OF WEB CONTENT

RELATED APPLICATIONS

This application is a continuation of, and claims priority to, U.S. patent application Ser. No. 12/772,616, titled "Validating the Origin of Web Content U.S. Patent, filed on May 3, 2010, which is a continuation of application Ser. No. 11/093,527, titled "Validating the Origin of Web Content," filed on Mar. 30, 2005, and now U.S. Pat. No. 7,725,930, the disclosures of which are hereby incorporated by reference in their entirety.

BACKGROUND

It has become increasingly important to ensure the integrity and security of communications and transactions conducted on the Internet. Internet users are subject to a variety of attacks, including pranks, attempts to gather private information, and outright fraud.

One of the most commonly used Internet communication protocols, referred to as Hypertext Transfer Protocol or "HTTP," is relatively insecure and therefore subject to a variety of attacks. So-called "phishing" attacks use "spoofed" emails and fraudulent websites to fool recipients into divulging personal data such as credit card numbers, account usernames and passwords, social security numbers, and other private information. For example, a phisher might design a website to look like the site of a legitimate bank, credit card company, or other business. Consumers are then lured to the website (whose domain name or Internet address is often very similar to that of the legitimate business) by an email that is also designed and configured to look like it comes from the legitimate institution. Once at the website, the consumer is asked to log in or otherwise provide confidential information.

By hijacking the trusted brands of well-known banks, online retailers, and credit card companies, phishers are able to fool up to 5% of their targets. These targets then become victims of credit card fraud, identity theft, and other forms of financial loss.

To avoid this outcome, some websites use a communications protocol referred to as Secure Sockets Layer, or "SSL". When using SSL, a digital certificate is used in a negotiation process to confirm the identity of a server and to facilitate exchange of encryption keys, resulting in both the server and the client sharing a symmetrical key used for subsequent encryption and decryption of data. As a result of the negotiations, SSL establishes a secure data channel between server and client, in which data passing between the two entities is encrypted.

A digital certificate is a compilation of information that includes the identity of the certificate owner and a public key that can be used to encrypt and sign information digitally. In addition, a digital certificate can contain other information, such as further information about the owner and any Internet domains the owner is authorized to operate from. Digital signatures are used to allow verification of the data contained in the certificates.

In conjunction with the SSL negotiation process, a browser evaluates the digital signature on a received certificate to determine if the certificate has been digitally signed by a trusted third party, known as a "Certifying Authority" or "CA". The third party is an entity whose business is issuing such certificates and vouching for the identities of their owners. If a trusted third party has signed the certificate, the browser or client can assume that the information contained in the certificate is accurate. Other forms of certificate validation are also available.

Although SSL performs well, it incurs significant overhead, primarily in processing resources. Specifically, the encryption and decryption at the server limit the number of simultaneous clients that a single server can efficiently support.

SUMMARY

Disclosed herein is a system for authenticating the origin of Internet content. A client in such a system obtains certificates from servers from which content is to be obtained. The client verifies the certificates and qualifies further communications based on information contained in the certificates. Techniques are also disclosed for verifying the authenticity of the content itself

DETAILED DESCRIPTION

Figure 1:
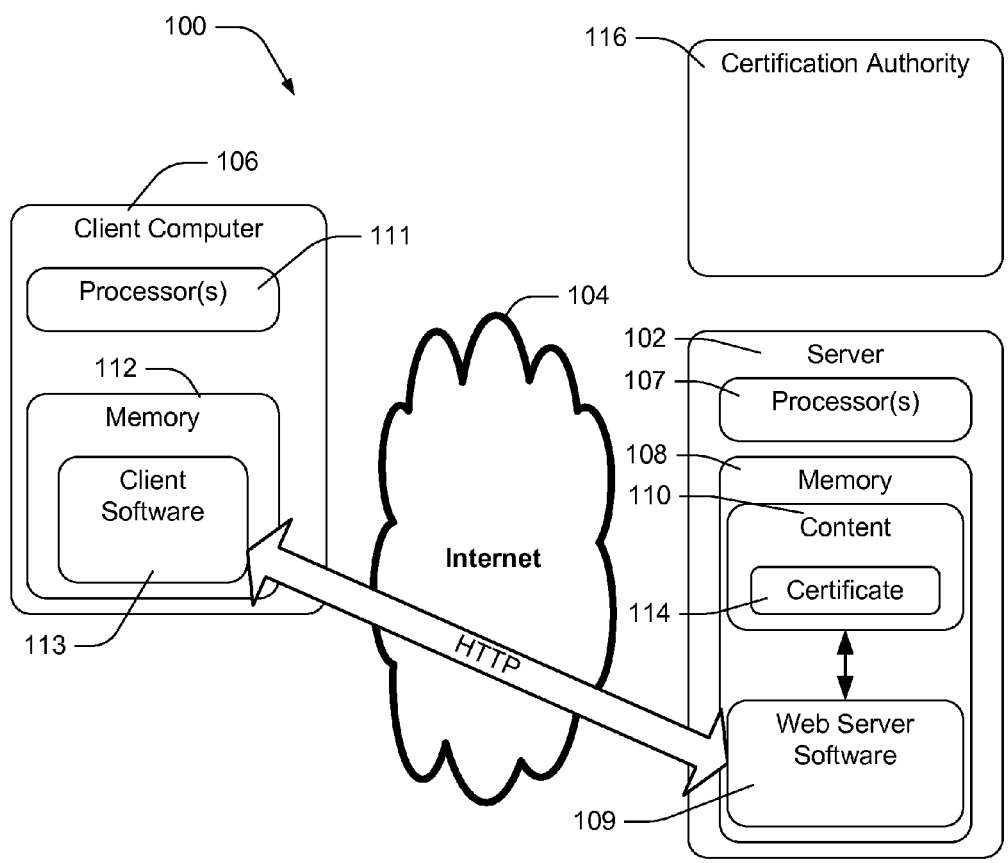
FIG. 1 is a block diagram of a network server/client system.

FIG. 1 illustrates one example of an Internet-based system 100 with a server 102 accessible through the Internet 104 by a large number of clients, only one of which is shown in FIG. 1 as client computer 106. For purposes of this discussion, the Internet comprises a public network that connects various entities including servers and clients. In general, a "server" is a source of information or data, and a "client" is a consumer of such information or data. These roles are not always exclusive, however, and it is recognized that the functions of server and client can be distributed and that information and data may flow in either or both directions. In general, communications between a server and client are usually (but not always) initiated by a client.

Although the Internet is currently the most pervasive public network, the technology described below can be used in other networks in which protection from malicious activity is desirable. Furthermore, although the Internet is associated with a known set of communication protocols and standards, the described technology can also be adapted to other protocols and standards. For purposes of clarity, the following discussion is set within the framework of current Internet technologies; however, the invention is not limited to such current Internet technologies.

Server 102 is a conventional Internet or Web server, comprising a single computer or, in some situations, a server farm having multiple computers. Server 102 has one or more processors 107 and computer-readable media or memory 108, including both removable and non-removable memory.

Server 102 has web server software 109, such as a variant of Internet Information Services (IIS), available from Microsoft Corporation. The web server software comprises instructions residing in memory 108, which are executable by the server computer and its processor(s) 107 to perform any of the server-based techniques described below.

Server 102 stores or has access to content 110. Although content 110 is shown as residing in memory 108, such content can reside in various locations, either local or remote to server computer 102. Content 110 comprises data or information that the server makes available to requesting clients. In many situations, the content is organized by location addresses referred to as Uniform Resource Locators, or URLs. A URL is a textual descriptor such as "http://xyzcorp.com/main" that corresponds to a physical or logical location within server 102 of some particular static or dynamic data.

Client 106 can be a conventional user-oriented computer such as a desktop computer, a laptop computer, a handheld, an Internet-enabled telephone, or any other device that can issue requests to server 102. In this example, client 106 is a typical personal computer having access to Internet 104 by some means such as telephone modem, cable modem, ISDN, DSL, local area or corporate network, or some other type of persistent or on-demand data connection.

Client 106 has one or more processors 111 and computer-readable media or memory 112 including both removable and non-removable memory. Client 106 has browser software 113 such as Internet Explorer, available from Microsoft Corporation. The browser software comprises instructions residing in memory 112, which are executable by the client computer and its processor(s) 111 to perform any of the client-based techniques described below.

Browser software such as this typically allows a user to specify a URL, in response to which the browser takes necessary steps to obtain the information available at that URL and displays the information to the user on a graphics display. Note that the techniques described below can also be used with other types of clients, some of which might not involve user interaction and/or graphic display.

Note that both server 102 and client 106 have additional software, not shown, such as operating systems, utilities, drivers, etc., which may aid in performance of the techniques described below. Specific responsibility for the described actions may be distributed in many different ways. Furthermore, the described functionality may be implemented either by incorporation with or addition to existing software products (such as existing browser and server products), by way of supplemental software that works in conjunction with such existing software products, or as stand-alone products or software modules.

Communications between client 106 and server 102 take place through Internet 104, typically using a communications protocol known as Hypertext Transfer Protocol or HTTP. In response to a user selecting or specifying a URL, the browser formats an HTTP request and submits it over Internet 104. The specified URL is part of the HTTP request and inherently corresponds to an Internet server; the request is routed to that server. In response to receiving the request, the server formulates an HTTP response, which is routed with the requested data or information to the client or client browser. The client browser then displays or otherwise renders the information for the user.

As noted above in the "Background" section, these communications are inherently insecure and subject to attack. To improve security, SSL connections can be used rather than standard HTTP connections. However, using SSL often entails significant server overhead.

The inventors have discovered that in many situations, the comprehensive security provided by SSL is not needed. Rather, it would be useful in many situations to allow the user to ensure that he or she is communicating with a legitimate web site, and that the purported owner or operator of the web site is the actual owner or operator—that the web site is not a phishing scam.

In this example, browser 113 is configured to authenticate—verify the identity—of the server with which it is exchanging data and to qualify subsequent communications with the server based on the results of the authentication. Such authentication is performed by obtaining and validating a digital certificate 114.

Digital certificate 114 may be one of various types of certificates. In this example, it is a conventional public-key certificate as commonly used in SSL transactions. The certificate indicates the name of the owner of the certificate and one or more Internet domains in which the indicated owner is known or authorized to operate. For example, the certificate might indicate "XYZ Corporation" as the owner of the certificate and "xyzcorp.com" as an Internet domain from which the owner is authorized to operate. The certificate also indicates a public-key associated with the owner of the certificate, corresponding to a private key that is held in secret by the owner. In addition, the certificate might indicate other information, such as further identifying information about the owner, and the identity of the issuer of the certificate.

A certificate such as digital certificate 114 is commonly obtained from a trusted entity known as a Certification Authority, or CA, indicated in FIG. 1 as Certification Authority 116. The certificate is typically signed with the private key of the CA, and its validity can therefore be determined by verifying the signature using the public key of the CA.

Figure 2:
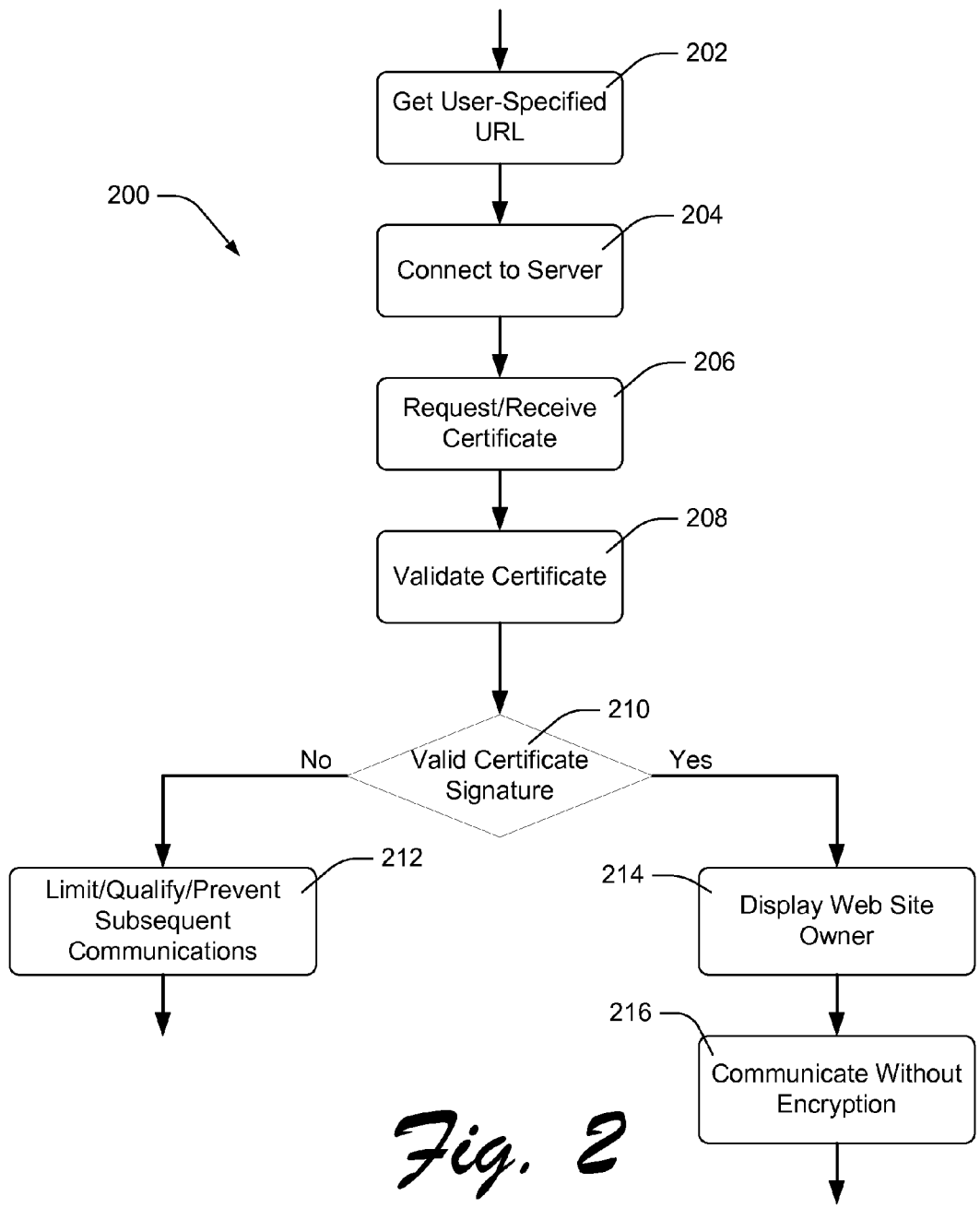
FIG. 2 is a flowchart illustrating a technique employed by the system of FIG. 1.

FIG. 2 shows a process 200 performed by browser 113 or another client to communicate with server 102. In block 202, a user enters or selects a URL, and the browser receives the URL. The URL specifies an Internet domain (such as "xyzcorp.com") and optionally a specific location at that domain. The Domain Name System (DNS) of the Internet resolves the URL to a server such as server 102, and HTTP requests specifying the URL are routed to that server. Note that domains or servers may be specified in other ways, such as by specifying numerical IP addresses.

In response to the URL, at block 204, browser 113 establishes an HTTP connection with the server at the domain designated by the URL selected by the user. Block 206 comprises requesting and receiving a certificate that is purportedly associated with the domain specified by the URL. As explained above, the certificate indicates one or more authorized Internet domains and a name of an owner or entity authorized to operate from the indicated Internet domains. In addition, the certificate typically contains or is accompanied by a digital signature, by the issuing CA, that can be used to verify the validity of the certificate.

Obtaining the certificate can be done in a variety of ways. In the configuration of FIG. 1, the certificate is stored at a predetermined location on server 102, which can be referenced by a predetermined URL relative to the domain name specified by the user. For example, it might be determined by convention that the certificate will always be stored at location "certificate" on the specified domain—every domain will then use this location as a standard location for its certificate. Thus, if the user specifies the domain "xyzcorp.com", the certificate will be found (if available) at "xyzcorp.com/certificate". This technique requires very little work to implement on the server: all that is needed is to store the certificate at the specified location, and clients can retrieve it with HTTP requests.

Alternatively, some other process might be used to obtain a certificate from the server. For example, the first portion of the SSL negotiation process results in an exchange of one or more certificates; a similar preliminary negotiation process could be used in the system described herein to obtain the server's certificate.

As another alternative, certificates might be obtained from a third party, such as from CA 116, or from some other repository. In some cases, the client itself might retain a repository of previously obtained certificates, which would obviate the need to request the certificate anew.

Block 208 comprises validating the received certificate. There are various ways this can be accomplished. One way to validate the certificate is to obtain the public key of the CA that issued the certificate, and verify the digital signature of the certificate using the CA's public key. Another option might be to submit the entire certificate to the CA for validation.

Block 210 comprises determining or deciding whether the received certificate is valid, or of qualifying subsequent communications with the server based on whether the server is trusted. This step may be determined automatically by the browser, or in conjunction with some form of user supervision or input. The decision may be based on several factors.

An initial factor in making trust decision 210 might be whether a valid certificate was obtained from the server. In some cases, a browser might be configured not to trust any server unless it supplies a valid certificate. Alternatively, the user might be warned or prompted when no valid certificate is available. In this case, "valid" means that the certificate has been successfully verified as being issued by a trusted party, or that some other mechanism has been used to determine that the certificate contains accurate information.

If a valid certificate has been received, trust decision 210 might include comparing the Internet domain specified in the URL (block 202) with the authorized domains indicated by the received certificate. If the domain currently specified by the user is not listed by the certificate, the trust decision will be negative.

Trust decision 210 may also involve evaluating the name of the entity specified in the certificate as being authorized to operate from the listed domains. In some cases, the browser may be preconfigured (either permanently or by user configuration) to trust or distrust specified entities. If so, the entity specified in the certificate is compared against a preconfigured list of entities, and the trust decision is made automatically on this basis: if the specified entity is on a preconfigured list that indicates non-trusted entities, trust decision 210 is negative; if the specified entity is on a preconfigured list that indicates trusted entities, trust decision 210 is positive.

In other cases, or if the entity specified in the certificate is not on a preconfigured list as described above, a user may provide input regarding the trust decision. In this case, trust decision 210 may involve displaying an explicit prompt or warning to the user, asking the user for an indication of either trust or non-trust with respect to the current domain owner. As an example, such prompting may include displaying certificate information to the user, possibly including details other than simply the name of the web site owner. The user is expected to examine this information and to indicate whether or not the browser should proceed with downloading the requested content.

If trust decision 210 is negative, execution flows to block 212, which comprises limiting or preventing subsequent communications with the server or domain specified by the user in step 202. This might involve merely displaying a warning dialog to the user, asking whether the user wants to continue. Alternatively, client 113 might unconditionally block access to the indicated server or domain. Various other intermediate types of limitations can also be utilized, such as allowing the browser to download content but not to submit information to the server. Another variation might be to allow the user to submit only certain types of information to a requesting web page. Yet another variation might be to limit the types of content that will be rendered. For example, a web site might be prevented from executing active content such as scripts of ActiveX controls. One more type of limitation might be to simply warn the user and advise him/her to leave the web site.

If trust decision 210 is positive, execution flows to block 214, which comprises displaying the name of the entity which owns or operates the web site to a human user who has navigated to the web site. The name of this entity is determined from the previously received and validated certificate. Based on this information, the user can decide whether to perform or allow subsequent communications with the server, or whether to provide sensitive information to the web site.

Block 216 can be performed concurrently with block 214, and comprises performing further communications, such as downloading server content, without encryption. Carrying out such communications without encryption avoids the significant server overhead that is typically incurred by encrypted SSL connections. However, the qualifying certificate validation and trust decision 210 provide significant meaningful protections against malicious attacks, even without such encryption.

Figure 3:
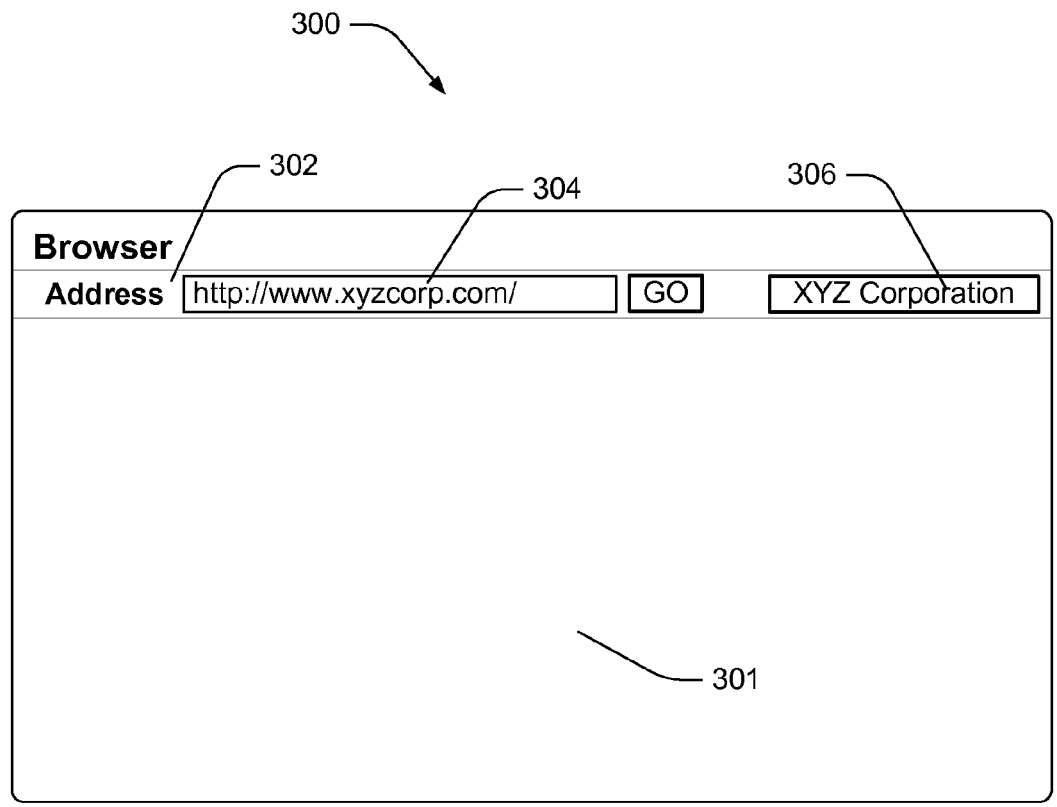
FIG. 3 shows an example of an Internet browser user interface resulting from the techniques of FIG. 2.

FIG. 3 illustrates a technique for displaying the name of the entity associated with the currently displayed web content, mentioned above with reference to block 214 of FIG. 2. FIG. 3 shows pertinent elements of a web browser user interface 300, having a content area 301 and a navigation bar 302. Navigation bar 302 includes an address bar 304 and an adjacent domain owner field 306. Address bar 304 is a conventional browser address bar that is used by a user to enter URLs and by the browser to display the URL of the currently displayed content. Domain owner field 306 is configured to display the owner of the domain containing the currently displayed content. The owner information is displayed only when available from a validated certificate that authenticates the indicated entity as being the owner/operator of the currently displayed domain.

The domain owner field 306 is displayed and updated continuously, as the user navigates from domain to domain, and is shown alongside and concurrently with content received from the server. If a validated certificate is not available from a particular domain to which the user has navigated, the domain owner field is left blank.

Presenting this information prominently and continuously, as the user navigates among different web sites, provides a previously unavailable method for the user to monitor the legitimacy of web sites and to decide whether to perform subsequent communications with the web site. Prior to entering any sensitive information, the user can simply refer to the domain owner field 306 to determine the true identity of the entity to which he or she is submitting the information. The displayed entity name is obtained from a validated signature corresponding to the domain from which the displayed content has been obtained, and is thus reliable and difficult to spoof.

Figure 4:
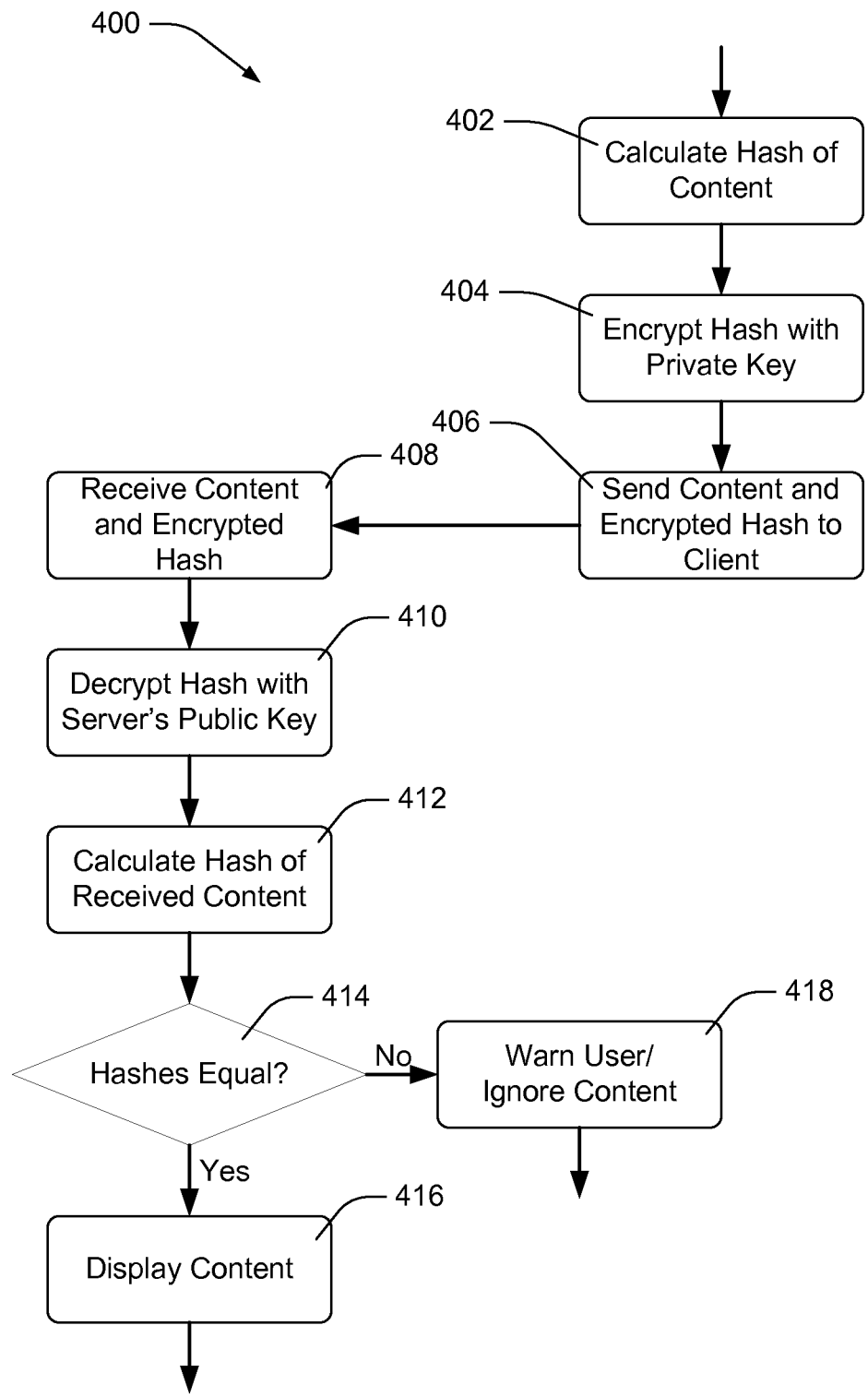
FIG. 4 is a flowchart illustrating another technique that can be employed by the system of FIG. 1.

Further security, still without incurring the overhead of SSL encryption, can be achieved by using techniques illustrated in FIG. 4, in conjunction with the techniques already described. Specifically, action 216 of FIG. 2 can be further qualified based on whether any received content is accompanied by one or more valid digital signatures of the content. Such signatures are made by server 102 and validated by client 106 or client software 113. Qualifying communications 216 based on the presence of a valid digital signature can comprise denying further communications, warning a user, or imposing some intermediate form of protection protect the user from malicious attacks.

FIG. 4 shows details of how this might be accomplished in the context of the system already described. FIG. 4 assumes that the actions of FIG. 3 have already been performed, that a valid certificate has been received by client 106, and that client 106 has recovered the server's public key from the certificate. The process involves validating one or more digital signatures, received with content from the server, using information in the certificate that has previously been received and validated; and conditioning communications upon receiving such valid digital signatures for content received from the server.

At block 402, the server calculates a hash of content that has been requested by the client. At block 404, the server encrypts the hash using the server's private key. At 406, the server sends the content and the encrypted hash to the client in response to the client's request.

The client receives the content and encrypted hash at block 408. At block 410, the client decrypts the hash with the server's public key. At block 412, the client calculates a hash of the received content, using the same hashing algorithm used by the server in block 402.

At block 414, the client compares the decrypted hash received from the server and the hash calculated by the client. If the two values are equal, block 416 is performed, comprising displaying or otherwise rendering the content. If the two values are not equal, block 418 is performed, comprising taking one or more measures to protect the user from what could be an attack on the user. For example, the client browser might warn the user and ask him or her whether to continue. Alternatively, the browser might ignore or refuse to display the content.

The techniques described above provide protection against certain types of attacks, without incurring the significant overhead of SSL communications.

In compliance with the statute, the invention has been described in language more or less specific as to structural and methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. One or more computer-readable storage devices comprising instructions that, when executed by a client device, implement a browser configured to:
   obtain input to navigate the browser to obtain web content at a particular address specified by the input;
   without establishing a secure data channel between the server and the client device:
      retrieve a certificate corresponding to a server associated with the particular address from a designated location before the web content is obtained from the particular address, the certificate containing information regarding an owner of the certificate and domains the owner is authorized to operate to facilitate a trust determination for the server; and
      determine whether or not to trust the server based at least in part upon whether the particular address specified by the input corresponds to a domain contained in the certificate that the owner is authorized to operate; and
   when the server is trusted based on the determination:
      ascertain an entity name for the owner of the certificate that is included in the certificate;
      configure a user interface for the browser to display the entity name along with the particular address; and
      enable subsequent communications with the server without establishing the secure data channel.

2. One or more computer-readable storage devices as recited in claim 1, wherein the determination of whether or not to trust the server further includes evaluating the entity name for the owner of the certificate against a preconfigured list of entities configured to designate name of entities that are trusted or distrusted.

3. One or more computer-readable storage devices as recited in claim 1, wherein the determination of whether or not to trust the server further includes verifying one or more digital signatures contained in the certificate to validate the obtained certificate.

4. One or more computer-readable storage devices as recited in claim 1, wherein the browser is further configured to limit subsequent communications with the server when the server is not trusted based on the determination.

5. One or more computer-readable storage devices as recited in claim 4, wherein the browser is further configured to prevent web content from being downloaded to limit subsequent communications with the server.

6. One or more computer-readable storage devices as recited in claim 1, wherein configuration of the user interface to display the entity name includes populating the entity name into a domain owner field that is located in the user interface adjacent to an address bar configured to present the particular address.

7. One or more computer-readable storage devices as recited in claim 1, wherein the subsequent communications with the server include accessing the web content from the particular address for rendering by the browser.

8. One or more computer-readable storage devices as recited in claim 1, wherein the certificate is retrieved from a predetermined certificate storage location on the server.

9. One or more computer-readable storage devices as recited in claim 1, wherein the browser is further configured to:
   ascertain an entity name for the owner that is included in the certificate; and
   output a prompt as part of the determination of trust that includes the entity name and is configured to prompt for input indicative of whether or not to trust the server based on the entity name.

10. A method implemented by a client device to validate a source of web content comprising:
   receiving a selection to navigate a browser of the client device to obtain web content available from a particular domain specified by the selection;
   without establishing a secure data channel between a server associated with the particular domain and the client device:
      establishing a connection to the server;
      obtaining a certificate corresponding to the server from a designated location before the web content available from the particular domain is obtained, the certificate containing information regarding an owner of the certificate and domains the owner is authorized to operate that is sufficient to enable a trust determination to be made for the server; and determining whether or not to trust the server based at least in part upon whether the obtained certificate corresponding to the server authorizes the particular domain specified by the selection; and responsive to determining that the server is trusted, enabling subsequent communications with the server without encryption.

11. The method as recited in claim 10, further comprising: responsive to determining that the server is not trusted, limiting subsequent communications with the server.

12. The method as recited in claim 11, wherein limiting subsequent communications with the server comprises preventing download of the web content by the browser.

13. The method as recited in claim 11, wherein limiting subsequent communications with the server comprises outputting a warning dialog configured to request input indicating whether or not to proceed with subsequent communications with the server.

14. The method as recited in claim 10, wherein the connection to the server is a hypertext transfer protocol (HTTP) connection.

15. The method as recited in claim 10, further comprising, responsive to determining that the server is trusted:

ascertaining an entity name for the owner of the certificate that is included in the certificate; and configuring a user interface for the browser to display the entity name for the owner of the certificate that is associated with the particular domain via the user interface.

16. The method as recited in claim 15, wherein configuring the user interface to display the entity name comprises configuring the user interface to display the entity name via a domain owner field that is adjacent to an address bar of the interface for the browser.

17. The method as recited in claim 10, wherein the subsequent communications without encryption include downloading the web content from the server for display by the browser.

18. A computing system comprising:

one or more processing components; and one or more computer-readable storage devices comprising instructions that, when executed by the one or more processing components, implement a browser configured to:

navigate to a server associated with a domain in response to input of an address contained within the domain;

qualify communications with the server based upon a determination of trust, including operations to:

obtain a certificate corresponding to the server from a designated location that indicates one or more authorized domains associated with certificate, the certificate is obtained before web content available at the address is obtained and without establishing a secure data channel with the server;

determine whether the address that is input is contained within the one or more authorized domains associated with the certificate;

restrict subsequent communications with the server when the address that is input is not contained within the one or more authorized domains associated with the certificate; and enable subsequent communications with the server without encryption when the address that is input is contained within the one or more authorized domains associated with the certificate.

19. A computing system as recited in claim 18, wherein the address that is input comprises a uniform resource locator (URL) configured to direct the browser to obtain content from the server.

20. A computing system as recited in claim 18, wherein the browser is further configured to:

ascertain an entity name for the owner of the certificate that is included in the certificate; and when subsequent communications are enabled, output the entity name for the owner of the certificate for display within a user interface for the browser.

\* \* \* \* \*